United States Patent Office 3,475,374
Patented Oct. 28, 1969

3,475,374
QUINOXALINE POLYMER COMPOSITIONS
Carl S. Marvel, Tucson, Ariz., Masahiko Okada, Chikusa-ku, Nagoya, Japan, and Frans de Schryver, Berchem, Antwerp, Belgium, assignors to Research Corporation, New York, N.Y., a nonprofit corporation of New York
No Drawing. Filed Feb. 6, 1968, Ser. No. 703,262
Int. Cl. C08g 23/00, 25/00
U.S. Cl. 260—47
4 Claims

ABSTRACT OF THE DISCLOSURE

Tetrachloro- and tetrahydroxyquinoxaline and tetra-azaanthracenes are condensed with diaminodiphenols or diaminodithiophenols to produce polymers characterized by the presence of a quinoxaline nucleus and a benzoxazine or a benzothiazine nucleus in the repeating unit of the polymer. The result single-stand and double-stand polymers are useful in the preparation of oxidation- and corrosion-resistant articles capable of use at elevated temperatures.

---

This invention relates to oxygen or sulfur-containing quinoxaline polymer compositions.

The compositions of the present invention are condensed heterocyclic single-strand or double-strand polymers characterized by the presence of a quinoxaline nucleus and a benzoxazine or a benzothiazine nucleus in the repeating unit of the polymer. These high melting compositions are further characterized by a high degree of thermal stability and stability to oxidation at elevated temperatures making them useful in the preparation of oxidation- and corrosion-resistant articles capable of use at temperatures in excess of 400° C.

More specifically, the single-strand quinoxaline polymers of the present inventions are characterized by the following recurring structure units (Z represents O or S):

I. Hexaazaheptacene units:

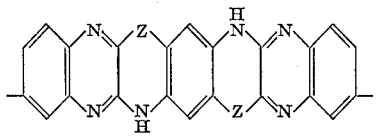

8H, 17H - quinoxalino[2,3-b]quinoxalino[2',3':5,6][1,4] oxa- or thiazino[2,3-g][1,4]benzoxazine or benzothiazine-2,12-diyl.

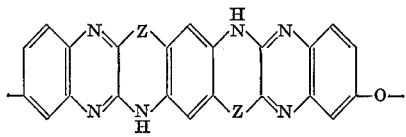

12 - oxy-8H,17H-quinoxalino[2,3-b]quinoxalino[2',3':5,6][1,4] oxa- or thiazino[2,3-g][1,4]benzoxazine or benzothiazine-2,12-diyl.

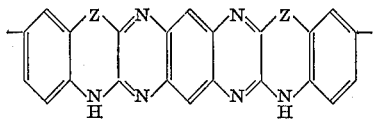

14H, 18H-benzo[1'',2'':5,6;5''',4''':5',6'] dipyrazino[2,3-b:2',3'-b']bis[1,4] benzoxazine or benzothiazine-3,11-diyl.

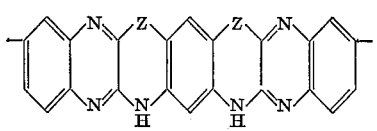

15H,17H - quinoxalino[2,3-b]quinoxalino [2',3':5,6][1,4] oxazino or thiazino[3,2-g][1,4]benzoxazine or benzothiazine-3,11-diyl.

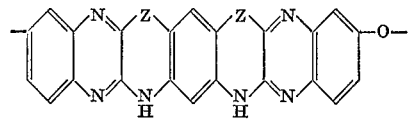

11-oxy-15H,17H-quinoxalino[2,3-b]quinoxalino [2',3':5,6][1,4] oxazino or thiazino[3,2-g][1,4]benzoxazine or benzothiazine-3,11-diyl.

II. bis-quinoxalinobenzoxazine or bis-quinoxalinobenzothiazine units:

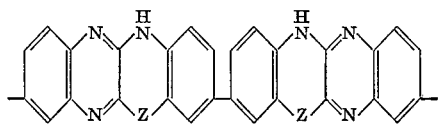

3,3'-bi - 12H - quinoxalino[2,3-b][1,4]benzoxazine or benzothiazine-8,8'-diyl.

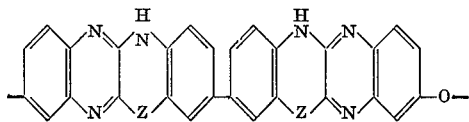

8' - oxy - 3,3' - bi - 12H - quinoxalino[2,3-b][1,4]benzoxazine or benzothiazine-8,8'-diyl.

III. Diazapentacene units (not quinoxaline nucleus-containing but similar in properties to the other quinoxaline nucleus-containing, single-strand polymers of the invention):

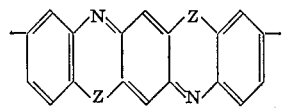

Polytripheno-dioxazine or dithiazine.

The double-strand quinaxoline polymers of the present invention are characterized by the following recurring structural units (again Z represents O or S):

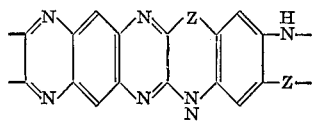

12H - pyrazino[2',3':6,7]quinoxalino[2,3 - b][1,4] benzoxazine- or benzothiazine - 2,3,9,10-tetrayl-9-imino-10-oxy or 10-thio.

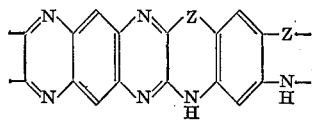

12H - pyrazino[2',3':6,7]quinoxalino[2,3-b][1,4]benzoxazine- or benzothiazine-2,3:9,10-tetrayl-10-imino-9-oxy or 9-thio.

The thermostable and highly colored single-strand and double-strand polymer compositions of the present invention melt above 360° C. and are generally insoluble in conventional organic solvents but are somewhat soluble in strongly acidic solvents such as sulfuric acid, polyphosphoric acid and methanesulfonic acid. These compositions may be formed into fibers, cast as films or otherwise converted to shaped articles wherein their unique stability to elevated temperatures may be effectively utilized.

The double-strand polymer compositions of the present invention are particularly adapted to drawing as textile fibers and may be used alone or in conjunction with other fibers to improve their high temperature properties. Such fibers may be woven or knit into fabrics resistant to corrosion and to the action of moisture and oxygen. Similarly, polymeric films may be used to protect other articles from corrosion and other adverse effects accelerated by exposure to elevated temperatures.

The single- and double-strand, oxygen-containing polymers of the present invention are prepared by the condensation of diaminodiphenols with tetrachloro- or tetrahydroxyquinoxaline or tetraazaanthracene compounds using polyphosphoric acid, pyridine and naphthalene as the reaction media. The corresponding sulfur-containing polymers are prepared by the condensation of diaminodithiophenols with analogous tetrahydroxy and tetrachloro compounds using dimethylacetamide, hexamethylphosphoramide and polyphosphoric acid as the reaction media.

In the preferred methods for preparing the oxygen-containing polymers, equimolar amounts of the diaminodiphenol and tetrahydroxy or tetrachloro reactant are heated under nitrogen in pyridine at 110° C. or in naphthalene at 210° C. The polymeric product is isolated from the pyridine reaction mixture by treating a large volume of water and purifying the separated solid with ethanol and benzene in a Soxhlet extractor. The product from the naphthalene reaction mixture is isolated and purified by treating the reaction mixture with a large volume of ethanol to dissolve the naphthalene and washing the residual solid with dilute ammonium hydroxide followed by extraction with ethanol and benzene. When the product obtained appears to contain uncyclized units, it is further heated under vacuum in a rotating flask at temperatures in the range 250–350° C. for several hours to complete cyclization.

The sulfur-containing polymers are more conveniently prepared by heating the reactions dissolved in a molten amide such as dimethylacetamide or hexamethylphosphoramide for a few hours at about 70–150° C. The crude polymer product is isolated by decomposing the reaction mixture with a large volume of water containing a small amount of ammonia or alkali. After washing and extraction with boiling benzene to remove unreacted materials, the crude product, if necessary, is heated in vacuo to complete ring closure. The product is purified by extraction as above.

Thermogravimetric analyses on representative polymer compositions of the present invention were run in nitrogen or helium with heating at the rate of 150–180° C. per hour; initial weight loss occurred at temperatures above 450° C. The product polymers, being thermally resistant compositions, were incompletely burned during the course of carbon-hydrogen combustion analysis yielding analytical values for carbon somewhat below the theoretical.

The present invention is further illustrated by means of the following examples which show the preparation of the intermediates utilized and representative single-strand and double-strand quinoxaline polymers according to the invention.

INTERMEDIATES

Example I.—2,2',3,3'-tetrachloro-6,6'-bisquinoxaline

A mixture of 2.2 g. of 3,3'-diaminobenzidine and 2.6 g. of oxalic acid dihydrate was dissolved in 20 ml. of 4 N hydrochloric acid and the solution heated at reflux temperature for 3 hours. The reaction mixture was cooled, the cyclic diamide intermediate collected on a filter, washed with methanol and dried. Five g. of the intermediate was placed in a flask with 15 ml. of phosphorus oxychloride and 5 ml. of N,N-dimethylaniline. The solution was heated at reflux temperature for 3 hours, cooled, and poured into 100 ml. of ice water. The precipitate was collected on a filter, dried and extracted with hot benzene to yield 4.7 g. of 2,2',3,3'-tetrachloro-6,6'-bisquinoxaline, M.P. 293–294° C.

Example II.—2,2',3,3'-tetrahydroxy-6,6'-diquinoxalyl ether

A mixture of 18.8 g. of 3,3',4,4'-tetraaminodiphenyl ether tetrahydrochloride and 12.6 g. of oxalic acid dihydrate was dissolved in 300 ml. of 4 N hydrochloric acid and the solution refluxed for 3 hours. After cooling, the yellow precipitate was collected, washed with water and dried. The yield of 2,2',3,3'-tetrahydroxy-6,6'-diquinoxalyl ether was 96.3%.

Example III.—2,2',3,3'-tetrachloro-6,6'-diquinoxalyl ether

A mixture of 10.1 g. of 2,2',3,3'-tetrahydroxy-6,6'-diquinoxalyl ether, 27.5 ml. of phosphorus oxychloride and 20 ml. of N,N-dimethylaniline was refluxed for 3 hours. The dark brown viscous reaction mixture was poured into an ice-hydrochloric acid mixture to give a yellow precipitate, which was collected, washed with dilute hydrochloric acid and water, and dried. Extraction with boiling benzene gave a 72% yield of 2,2',3,3'-tetrachloro-6,6'-diquinoxalyl ether, M.P. 219–220° C.

Example. IV.—2,3,7,8-tetrahydroxy-1,4,6,9-tetraazaanthracene

Ten g. of 1,5-diamino-2,4-dinitrobenzene was hydrogenated in 50 ml. of dioxane at 60° C. with 1 g. of 5% Pd on charcoal. When the absorption of hydrogen had stopped, the reaction mixture was cooled and the solvent poured off under nitrogen and discarded. The tetramine was separated from the catalyst by dissolving it in 100 ml. of degassed 2 N hydrochloric acid and filtering into 200 ml. of concentrated hydrochloric acid, and then boiled under reflux for 3 hours with 20 g. of oxalic acid. A nearly theoretical yield of 2,3,7,8-tetrahydroxy-1,4,6,9-tetraazaanthracene precipitated as a light brown solid.

Example V.—2,3,7,8-tetrachloro-1,4,6,9-tetraazaanthracene (A) A mixture of 12.3 g. of 2,3,7,8-tetrahydroxy-1,4,6,9-tetraazaanthracene, 62 g. of phosphorus oxychloride, and 123 g. antimony trichloride were refluxed together for 7 hours. After cooling, the reaction mixture was poured onto a mixture of ice and concentrated hydrochloric acid. The residue was separated by centrifugation, washed successively with dilute hydrochloric acid, water and methanol, dried and then extracted with benzene in a Soxhlet apparatus. The yield of 2,3,7,8-tetrachloro-1,4,6,9-tetraazaanthracene was 5.2 g., pale yellow needles, M.P. 330° C.

(B) A mixture of 1.23 g. of 2,3,7,8-tetrahydroxy-1,4,6,9-tetraazaanthracene, 4.16 g. of phosphorus pentachloride and 10 g. of antimony trichloride were boiled under reflux for 3 hours and the reaction product worked up as described in the previous paragraph to give a yield of 0.60 g. of the same product. Fractional crystallization of the mother liquors after passage through a short alumina column to remove the dark impurities gave an additonal 75 mg. of the product.

Example VI.—2,5-diamino-1,4-dihydroxybenzene 2,5-dihydroxy-p-benzoquinone in hot methanol solution was treated with gaseous hydrogen chloride. The 2,5-dimethoxy-p-benzoquinone thus obtained was aminated with ammonia in hot ethanol and then reduced with stannous chloride in concentrated hydrochloric acid to yield 2,5-diamino-1,4-dihydroxybenzene dihydrochloride.

Example VII.—3,3'-dimercaptobenzidine dihydrochloride

To a solution of 0.1 mole of benzidine (recrystallized from ether) in 250 ml. of glacial acetic acid maintained at 15–18° C. there was added 0.4 mole of ammonium thiocyanate and then dropwise over a period of 45 minutes a solution of 0.18 mole of bromine in 120 ml. of glacial acetic acid. After vigorous stirring at 15–18° C. for an additional 3 hours, the yellow pasty reaction mixture was transferred to a flask containing 2 l. of water to yield a yellow solid, which was collected, washed thoroughly with water and dried. The solid was dissolved by heating in 3 l. of boiling water containing 15 ml. of concentrated hydrochloric acid for half an hour, and the resultant solution was filtered while hot. The addition of 200 ml. of concentrated hydrochloric acid to the filtrate gave yellow crystals of 2,2'-diamino-6,6'-bisbenzthiazole dihydrochloride.

The potassium salt of 3,3'-dimercaptobenzidine was obtained by refluxing 2,2'-diamino-6,6'-bisbenzthiazole dihydrochloride with 150 g. of potassium hydroxide and 100 ml. of water for 3 hours and allowing the resultant solution to stand at room temperature overnight. Five g. of the potassium salt was dissolved in 50 ml. of water, the undissolved material was removed by filtration, and the filtrate poured into 75 ml. of 4 N hydrochloric acid to yield yellow crystals of 3,3'-dimercaptobenzidine dihydrochloride.

Example VIII.—4,6-diamino-1,3-dithiocyanobenzene

A solution of 17.5 g. of freshly prepared dichlorourea in 220 ml. of acetic acid was added dropwise over a period of 40 minutes to a mixture of 14.5 g. of m-phenylenediamine and 20.5 g. of ammonium thiocyanate in 220 ml. of acetic acid maintained at 15–18° C. The reaction mixture was stirred for an additional 20 minutes and poured into 3 l. of ice water to yield a light gray solid. The solid was separated and washed with water until acid-free and recrystallized twice from hot alcohol to yield 13.5 g. of 4,6-diamino-1,3-dithiocyanobenzene, light brown crystals M.P., 170–171° C. with decomposition.

Example IX.—4,6-diamino-1,3-dithiophenol

Under nitrogen, 4.4 g. of 4,6-diamino-1,3-dithiocyanobenzene was added in portions to a solution of 10.8 g. of sodium disulfide in 50 ml. of water at 50 to 55° C. After further warming at 50–55° C. for 30 minutes, the reaction mixture was filtered and the ice-cooled filtrate was poured into 200 ml. of ice-cooled 50% aqueous acetic acid to give a yellow bulky solid. The solid was collected on a glass filter, washed thoroughly with water and finally with a small amount of cold methanol under a stream of nitrogen and dried. Careful recrystallization from ethanol under nitrogen gave 1.6 g. of 4,6-diamino-1,3-dithiophenol as yellow powder, M.P. 99–100° C. with decomposition. Since the free base is highly sensitive to air, it was converted to the dihydrochloride salt and used as such.

SINGLE-STRAND POLYMERS

Example X.—Poly(8H,17H - quinoxalino[2,3-b]quinoxalino[2',3':5,6][1,4]oxazino[2,3 - g][1,4]benzoxazine-2,12-diyl)

A mixture of 0.005 mole of 2,2',3,3'-tetrahydroxy-6,6'-bisquinoxaline and 0.005 mole of 2,5-diamino-1,4-dihydroxybenzene dihydrochloride in 50 g. of freshly prepared polyphosphoric acid was heated at 230° C. for 24 hours under nitrogen. The viscous reaction mixture, while still hot, was poured into 1 l. of water in a blender and then neutralized with ammonium carbonate. The black solid precipitate was separated, and extracted with boiling water for 3 days and then with methanol for 12 hours. The product polymer after drying under vacuum weighed 1.75 g. The polymer was soluble in methanesulfonic acid, 85% phosphoric acid and concentrated sulfuric acid, and slightly soluble in dimethylsulfoxide. The inherent viscosity in methanesulfonic was 0.48 (0.2% concentration at 30° C.).

Example XI.—Poly(12 - oxy - 8H,17H, - quinoxalino[2,3 - b]quinoxalino[2',3':5,6][1,4]oxazino[2,3 - g][1,4]benzoxazine-2,12-diyl)

A mixture of 2.06 g. of 2,2',3,3'-tetrachloro-6,6'-diquinoxalylether and 1.07 g. of 2,5-diamino-1,4-dihydroxybenzene dihydrochloride was heated in 40 ml. of pyridine at 115° C. for 24 hours. The reaction mixture was poured into 1 l. of dilute ammonium hydroxide in a blender to yield a black precipitate. The precipitate was separated, washed with water and extracted with boiling water several days and with methanol for one day. After drying under reduced pressure at 60° C., there was obtained a 74% yield of the product polymer as a dark brown powdery material slightly soluble in concentrated sulfuric acid and having an inherent viscosity of 0.35 (0.07% concentration at 30° C.).

Example XII.—(Poly(14H,18H-benzo[1",2":5,6;5"',4"': 5',6']dipyrazino[2,3 - b:2',3' - b]bis[1,4]benzoxazine-3,11-diyl)

(A) A mixture of 0.005 mole of 2,3,7,8-tetrahydroxy-1,4,6,9-tetraazaanthracene and 0.005 mole of 3,3'-dihydroxybenzidine in 70 g. of polyphosphoric acid was heated at 250° C. for 24 hours under a nitrogen atmosphere. (The 3,3'-dihydroxybenzidine reactant was prepared by heating o-dianisidine dihydrochloride and anhydrous aluminum chloride in toluene.) The resultant highly viscous solution was poured into 1 l. of water in a blender followed by neutralization with ammonium carbonate. The brown precipitate was separated, extracted with boiling water for a prolonged time and dried under vacuum. The yield of the polymer was 1.75 g.; it had an inherent viscosity in methanesulfonic acid of 0.68 (0.2% concentration at 30° C.).

(B) A mixture of 1.12 g. of 2,3,7,8-tetrachloro-1,4,6,9-tetraazaanthracene and 0.86 g. of 3,3'-dihydroxybenzidine was heated in 25 ml. of pyridine under nitrogen at reflux temperature. The dark reaction mixture was worked up as in Example XI to yield 1.34 g. of the product polymer which had an inherent viscosity of 0.38 in concentrated sulfuric acid.

Example XIII.—Poly(8'-oxy-3,3'-bi-12H-quinoxalino[2,3-b][1,4]benzoxazine-8,8'-diyl)

(A) A mixture of 1.03 g. of 2,2',3,3'-tetrachloro-6,6'-diquinoxalyl ether, 0.54 g. of 3,3'-dihydroxybenzidine and 8.0 g. of naphthalene was heated at 210° C. for 18 hours under nitrogen. After cooling, 300 ml. of ethanol was added to the reaction mixture to dissolve the naphthalene. The undissolved tan residue was washed with dilute ammonium hydroxide, water and ethanol, and dried. The solid residue was heated under vacuum in a rotating flask at 330° C. for 6 hours then extracted successively with ethanol and benzene. There was obtained 1.02 g. of the product polymer partly soluble in concentrated sulfuric acid and exhibiting an inherent viscosity of 0.36 (0.06% concentration at 30° C.)

(B) A mixture of 2.06 g. of 2,2',3,3'-tetrachloro-6,6'-diquinoxalyl ether and 1.08 g. of 3,3'-dihydroxybenzidine was heated in 40 ml. of pyridine at 115° C. for 24 hours.

The black reaction mixture was worked up as in Example XI to yield 1.92 g. of the product polymer.

Example XIV.—Poly(3,3'-bi-12H-quinoxalino[2,3-b][1,4]benzoxazine-8,8'-diyl)

A mixture of 0.005 mole of 2,2',3,3'-tetrahydroxy-6,6'-bisquinoxaline and 0.005 mole of 3,3'-dihydroxybenzidine in 70 g. of polyphosphoric acid was heated at 230° C. for 24 hours. The red brown viscous reaction mixture was poured into 1 l. of water in a blender followed by neutralization with ammonium hydroxide to give a black precipitate, which was separated, washed with water and extracted with boiling water for 3 days and with methanol for 24 hours. There was obtained 1.84 g. of the product polymer soluble in methanesulfonic acid and concentrated sulfuric acid, and slightly soluble in formic acid; it had an inherent viscosity in methanesulfonic acid of 0.49 (0.2% concentration at 30° C.).

Example XV.—Poly(3,3'-bi-12H-quinoxalino[2,3-b][1,4]benzothiazine-8,8'-diyl)

To a suspension of 6.75 g. of 2,2',3,3'-tetrachloro-6,6'-bisquinoxaline in 190 ml. of dimethylacetamide was added 5.47 g. of 3,3'-dimercaptobenzidine dihydrochloride at room temperature, and the mixture stirred under nitrogen at room temperature for 2 hours. The temperature was raised slowly to 150° C. and maintained at that temperature for 24 hours. The cooled, dark brown reaction mixture was poured with vigorous stirring into 4 l. of water containing ammonia to yield a brown-red precipitate, which was separated, washed with water and methanol, and dried. The residue was heated under vacuum at 320° C. for 6 hours and then extracted with benzene followed by ethanol. An 88% yield of the product polymer was obtained having an inherent viscosity in concentrated sulfuric acid of 1.48.

Example XVI.—Poly(8'-oxy-3,3'-bis-12H-quinoxalino[2,3-b][1,4]benzothiazine-8,8'-diyl)

To a mixture of 0.003 mole of 2,2',3,3'-tetrachloro-6,6'-diquinoxalyl ether and 75 ml. of deoxygenated dimethylacetamide was added 0.003 mole of 3,3'-dimercaptobenzidine dihydrochloride, and the mixture stirred at room temperature for 2 hours to yield a clear orange-red solution. The reaction mixture was then heated at 150° C. for 24 hours and, after cooling to room temperature, poured into 800 ml. of water containing 20 ml. of concentrated ammonium hydroxide. The resultant dark orange precipitate was collected by filtration, washed with water and methanol, and dried. The residual solid was heated under nitrogen at 300° C. for 6 hours and then extracted successively with ethanol and benzene. The product polymer, after drying under vacuum at 60° C. for 2 days, weighed 1.32 g., its inherent viscosity measured in methanesulfonic acid was 1.54 (0.2% concentration at 30° C.).

Example XVII.—Poly(14H,18H-benzo[1",2":5,6;5",4":5',6']dipyrazino[2,3-b:2',3'-b']bis[1,4]benzothiazine-3,11-diyl)

(A) Three-thousandths mole of 3,3'-dimercaptobenzidine dihydrochloride was added in portions to a mixture of 0.003 mole of 2,3,7,8-tetrachloro-1,4,6,9-tetraazaanthracene and 80 mol. of deoxygenated dimethylacetamide containing 0.15 g. of lithium chloride. The mixture was stirred under nitrogen at room temperature for 3 hours and then at 150° C. for 24 hours and decomposed by pouring with stirring into 800 ml. of water containing 20 ml. of concentrated ammonium hydroxide. The resultant black precipitate was separated, washed with water and ethanol, and dried. The solid residue was heated at 300° C. under nitrogen for 6 hours, then extracted with ethanol followed by benzene and dried under vacuum. The product polymer was obtained in 98% yield and had an inherent viscosity in methanesulfonic acid of 1.37 (0.2% concentration at 30° C.).

(B) A 1.34 g. portion of 3,3'-dimercaptobenzidine dihydrochloride was added to 50 g. of polyphosphoric acid and the mixture was warmed up to 100° C. under nitrogen. After the evolution of hydrogen chloride had ceased, 1.33 g. of 2,3,7,8-tetrachloro-1,4,6,9-tetraazaanthracene was added and the color of the mixture immediately turned to dark blue. Additional hydrogen chloride was evolved as the reaction temperature was raised slowly to 200° C.; the reaction mixture was heated at 200° C. for 24 hours. The viscous reaction mixture, while still hot, was poured into 1 l. of water with vigorous stirring and neutralized with ammonium carbonate. A black precipitate was separated, stirred in 10% ammonium hydroxide at 60° C. for 1 day, and then extracted with boiling water for 4 days and with ethanol overnight. The residue, after drying under reduced pressure, weighed 1.90 g. The black powdery product polymer thus obtained dissolved in concentrated sulfuric acid and methanesulfonic acid, and had an inherent viscosity in the former of 0.94 (0.2% concentration at 30° C.).

Example XVIII.—Poly(15H,17H-quinoxalino[2,3-b]quinoxalino[2',3':5,6][1,4]thiazino[3,2-g][1,4]benzothiazine-3,11-diyl)

To a suspension of 1.31 g. of 2,2',3,3'-tetrachloro-6,6'-bisquinoxaline in 50 ml. of dimethylacetamide at room temperature was added 0.57 g. of freshly prepared 4,6-diamino-1,3-dithiophenol. After stirring for 4 hours, the reaction mixture was heated under nitrogen at 150° C. for 24 hours. The cooled reaction mixture was decomposed by pouring into 1 l. of dilute ammonium hydroxide in a blender. The resultant dark red precipitate was separated, washed with water and ethanol, and then heated under vacuum at 320° C. for 5 hours. After washing with dilute ammonium hydroxide and water, and extraction with ethanol and benzene for 24 hours, there was obtained a 93% yield of the product polymer having an inherent viscosity in methanesulfonic acid of 1.47 (0.2% concentration at 30° C.).

Example XIX.—Poly(11-oxy-15H,17H-quinoxalino[2,3-b]quinoxalino[2',3':5,6][1,4]thiazino[3,2-g][1,4]benzothiazine-3,11-diyl)

To a suspension of 2.06 g. of 2,2',3,3'-tetrachloro-6,6'-diquinoxalyl ether in 60 ml. of dimethylacetamide was added under nitrogen 0.86 g. of freshly prepared 4,6-diamino-1,3-dithiophenol. After stirring at room temperature for 2 hours, the reaction temperature was raised to 150° C. and maintained at that temperature for 24 hours. The brown red reaction mixture was poured into 1 l. of water containing ammonia in a blender to yield a dark red precipitate which was washed with water and ethanol, and dried under reduced pressure. After heating at 300° C. for 5 hours under vacuum the polymeric solid was washed with dilute ammonium hydroxide and water, extracted with ethanol and benzene and dried under reduced pressure at 60° C. for 2 days. The product polymer had an inherent viscosity in methanesulfonic acid of 1.25.

Example XX.—Polytriphenodithiazine (A) To an ice-cooled solution of 0.89 g. of 2,5-dichloro-p-benzoquinone in 30 ml. of dimethylacetamide there was added 1.61 g. of 3,3'-dimercaptobenzidine dihydrochloride. After stirring at room temperature for 5 hours, the reaction temperature was slowly raised to 150° C. and maintained at that temperature for 24 hours. The reaction mixture was poured into dilute aqueous ammonium hydroxide, the resultant solid separated, washed with water and heated at 250–300° C. under vacuum in a rotating flask for 5 hours to yield 1.02 g. of the product polymer. Its ultraviolet spectrum in concentrated sulfuric acid showed maxima at 303 and 250 mμ, and it had an inherent viscosity of 0.12 in concentrated sulfuric acid.

(B) To a suspension of 1.61 g. of 3,3'-dimercaptobenzidine dihydrochloride in 50 g. of polyphosphoric acid was added under nitrogen 0.89 g. of 2,5-dichloro-p-benzoquinone. After stirring for an hour at room temperature, the reaction temperature was raised to 250° C. Heating was continued for 24 hours and the black gelled mass, while still hot, was added to 1 l. of dilute ammonium hydroxide in a blender to yield a black granular solid. The solid was pulverized, stirred with dilute ammonium hydroxide overnight, extracted with water for 3 days and then ethanol for one day. There was obtained, after drying under reduced pressure at 60° C., 1.43 g. of product polymer as a black powder slightly soluble in concentrated sulfuric acid; the soluble portion exhibited an inherent viscosity of 0.54 (0.07% concentration at 30° C.).

DOUBLE-STRAND POLYMERS

Example XXI.—Poly(12H-pyrazino[2′,3′:6,7]quinoxalino[2,3-b][1,4]benzoxazine-2,3:9,10-tetrayl-9-imino-10-oxyl)

(A) A mixture of 1.12 g. of 2,3,7,8-tetrachloro-1,4,6,9-tetraazaanthracene and 0.75 g. of 2,5-diamino-1,4-dihydroxybenzene dihydrochloride was heated under nitrogen in 30 ml. of pyridine at 110° C. for 24 hours. The black reaction mixture was poured into 1 l. of water with vigorous stirring giving a black precipitate which was separated, washed with water and ethanol, and dried. The solid was then heated under vacuum in a rotating flask at 320° C. for 5 hours, washed with dilute ammonium hydroxide and water, and successively extracted with ethanol and benzene. There was obtained, after drying for 24 hours under reduced pressure at 45° C., 0.89 g. of the product polymer slightly soluble in concentrated sulfuric acid and having an inherent viscosity of 0.54 (0.04% concentration at 30° C.).

(B) To an ice-cooled flask charged with 45 g. of phosphorus pentoxide, 9 ml. of distilled water was added dropwise over a period of 10 minutes. The heterogeneous mixture was heated at 200° C. for 1 hour with stirring under nitrogen to yield homogeneous polyphosphoric acid. After cooling to approximately 100° C., there was added 1.23 g. of 2,3,7,8-tetrahydroxy-1,4,6,9-tetraazaanthracene followed by 1.07 g. of 2,5-diamino-1,4-dihydroxybenzene dihydrochloride. The reaction mixture was gradually heated to 250° C. and kept at that temperature for 24 hours. The viscous reaction mixture was poured into 1 l. of dilute ammonium hydroxide in a blender to yield a black precipitate which separated, washed with water and extracted with boiling water for several days and with methanol for 1 day. After drying under reduced pressure at 60° C. there was obtained 1.55 g. of the product polymer partly soluble in methanesulfonic acid and concentrated sulfuric acid. The inherent viscosity of the soluble part was 0.85.

Example XXII.—Poly(12H-pyrazino[2′,3′:6,7]quinoxalino[2,3-b][1,4]benzothiazine - 2,3:9,10 - tetrayl - 10 - imino-9-thio)

(A) A suspension of 1.60 g. of 2,3,7,8-tetrachloro-1,4,6,9-tetraazaanthracene in 60 ml. of dimethylacetamide was heated at 120° C. overnight. On cooling to room temperature, 0.86 g. of freshly prepared 2,5-diamino-1,3-dithiophenol was added to the clear solution which turned dark brown. After stirring under nitrogen at room temperature for 2 hours and then at 150° C. for 24 hours, the reaction mixture was poured into 1 l. of dilute ammonium hydroxide in a blender. The resultant black solid was separated, washed several times with water and methanol, and dried under reduced pressure. The solid was then heated under vacuum at 300° C. for 4 hours. After cooling to room temperature, the solid was washed with dilute ammonium hydroxide, water and methanol, and then extracted with benzene for 24 hours. An 89% yield of the product polymer was obtained as a black powder having an inherent viscosity in methanesulfonic acid of 1.19 (0.2% concentration at 30° C.).

(B) A mixture of 0.661 g. of 4,6-diamino-1,3-dithiophenol dihydrochloride and 1.23 g. of 2,3,7,8-tetrahydroxy-1,4,6,9-tetraazaanthracene in polyphosphoric acid was slowly heated under nitrogen to 240° C. over a period of 2 hours and maintained at that temperature for an additional 18 hours. The black reaction mixture, while still hot, was poured into 1 l. of dilute ammonium hydroxide in a blender. The resultant black solid was separated, treated with warm dilute ammonium hydroxide (50–60° C.) for 2 days, and extracted with boiling water for 5 days and with ethanol overnight. There was obtained on drying at 60° C. under reduced pressure a 1.35 g. yield of the product polymer. The inherent viscosity was 0.22 in methanesulfonic acid (0.2% concentration at 30° C.).

We claim:

1. A film and fiber forming polymer consisting essentially of the recurring structural unit:

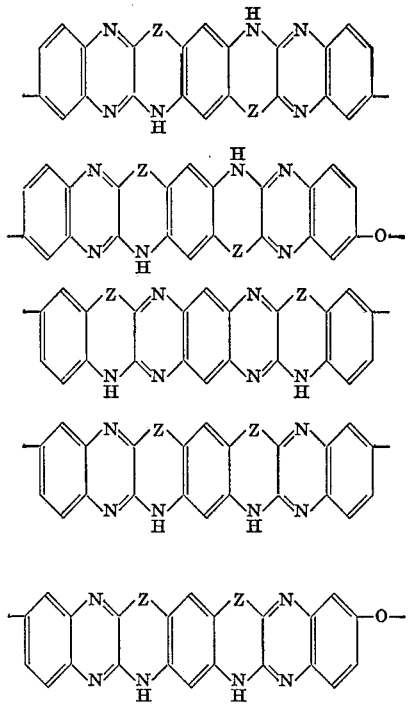

wherein Z is O or S.

2. A film and fiber forming polymer consisting essentially of the recurring structural unit:

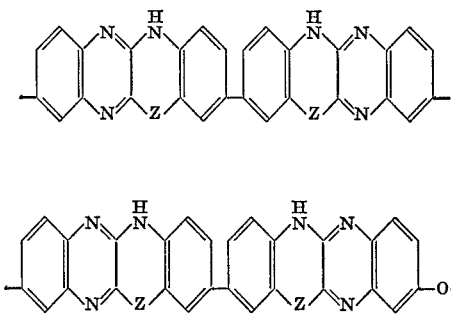

wherein Z is O or S.

3. A film and fiber forming polymer consisting essentially of the recurring structural unit:

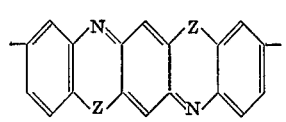

wherein Z is O or S.

4. A film and fiber forming polymer consisting essentially of the recurring structural unit:
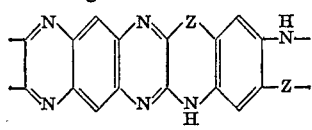
or
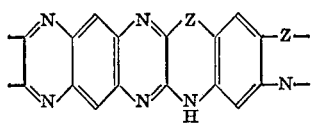
wherein Z is O or S.
References Cited
UNITED STATES PATENTS
3,326,915   6/1967   Jackson et al.
WILLIAM H. SHORT, Primary Examiner
L. L. LEE, Assistant Examiner
U.S. Cl. X.R.
117—161; 260—30.6, 30.8, 61, 79